United States Patent
Bache

(10) Patent No.: US 7,468,136 B2
(45) Date of Patent: Dec. 23, 2008

(54) GRIT TRAP

(75) Inventor: John C. Bache, Stourbridge (GB)

(73) Assignee: GL&V Management Hungary Kft., Budapest (HU)

( * ) Notice: Subject to any disclaimer, the term of this patent is extended or adjusted under 35 U.S.C. 154(b) by 116 days.

(21) Appl. No.: 10/574,997

(22) PCT Filed: Sep. 27, 2004

(86) PCT No.: PCT/GB2004/004102

§ 371 (c)(1),
(2), (4) Date: Jul. 13, 2006

(87) PCT Pub. No.: WO2005/035093

PCT Pub. Date: Apr. 21, 2005

(65) Prior Publication Data

US 2007/0119775 A1    May 31, 2007

(30) Foreign Application Priority Data

Oct. 9, 2003  (GB) ................................ 0323613.0

(51) Int. Cl.
*B01D 21/26* (2006.01)
*B03D 1/02* (2006.01)
*B03D 1/16* (2006.01)
*C02F 1/24* (2006.01)

(52) U.S. Cl. ..................... 210/703; 210/220; 210/221.1; 210/221.2; 210/788; 210/512.1; 210/512.3; 210/532.1; 209/164; 209/169; 209/724

(58) Field of Classification Search ............... 210/703, 210/221.2, 221.1, 788, 512.1, 512.3, 220, 210/532.1; 209/164, 169, 170, 724
See application file for complete search history.

(56) References Cited

U.S. PATENT DOCUMENTS 2,425,932 A * 8/1947 Green et al. ................. 210/788

(Continued)

FOREIGN PATENT DOCUMENTS

EP    0 292 020 A    11/1988

(Continued)

*Primary Examiner*—Thomas M Lithgow
(74) *Attorney, Agent, or Firm*—Coleman Sudi Sapone, P.C.; Michael Polacek, Esq.

(57) ABSTRACT

A vortex grit trap comprising a generally vertically extending tank of circular cross-section including a separation zone having an inlet and an outlet for liquid flow to and from the tank, and in which liquid is circulated about a longitudinal axis of the tank, and, a grit collection zone positioned beneath the separation zone in use, the trap being characterized by a generally circular tank divider centered on the vertical longitudinal axis of the tank and extending transverse thereto, the divider defining a notional boundary between the separation and collection zones of the tank and being of smaller diameter than the adjacent region of the tank so as to define with the adjacent tank wall an annulus through which grit passes from the separation zone to the collection zone in use, and, means for generating a cloud of gas bubbles migrating in use upwardly through substantially the whole of said annulus whereby substantially all grit passing from the separation zone into the collection zone passes through the upwardly moving bubble cloud in said annulus so that organic solids settling with the grit are displaced upwardly by the bubbles into the flow within the separation zone while the grit passes through the bubble cloud in the annulus and into the collection zone. There is also disclosed a method of separating grit from an aqueous sewage flow.

13 Claims, 3 Drawing Sheets

U.S. PATENT DOCUMENTS

| | | | |
|---|---|---|---|
| 3,129,173 A * | 4/1964 | Schulze | 210/512.1 |
| 3,941,698 A | 3/1976 | Weis | |
| 4,107,038 A * | 8/1978 | Weis | 210/801 |
| 4,519,907 A | 5/1985 | Rooney | |
| 4,576,720 A | 3/1986 | Mandt | |
| 4,759,854 A | 7/1988 | Wilson | |
| 4,767,532 A * | 8/1988 | Weis | 210/257.1 |

FOREIGN PATENT DOCUMENTS

| | | |
|---|---|---|
| FR | 2 726 203 A | 5/1996 |
| GB | 830 531 A | 3/1960 |

* cited by examiner

GRIT TRAP

TECHNICAL FIELD

This invention relates to a vortex grit trap for use in a sewage treatment plant.

BACKGROUND ART

It is recognised that the sewage flow from a main collection sewer system consists primarily of water containing organic solids which are to be removed from the water by the sewage treatment plant prior to discharge of the cleaned water back to the environment. However, additional to the organic load the sewage flow includes wood, paper, cotton, rags and the like (usually referred to as "screenings") together with grit and stones. It is usual to pass the raw sewage flow through screens or other filtering devices which extract paper rags and the like together with large stones; allowing the sewage flow with entrained grit and small stones to pass further into the sewage treatment plant.

Down-stream of the screens it is usual to pass the sewage flow through one or more grit traps which extract the grit and small stones from the flow leaving the water with entrained organic solids to pass into the sewage treatment plant for biological treatment. It will be recognised however that in some treatment plants the screening takes place downstream of the grit trap(s) and so it is desirable that the grit trap(s) are able to accommodate screenings in the flow.

Conventionally grit traps can take a number of forms, but a particularly convenient form is a vortex grit trap in which the sewage flow with entrained grit and small stones enters a generally circular-cylindrical separation chamber tangentially. Positioned below the separation chamber, and coaxial therewith is a smaller diameter circular-cylindrical grit collection chamber, and usually but not exclusively the interface of the settlement chamber and the grit collection chamber is a frusto-conical region which guides grit falling from the flow in the settlement chamber into the collection chamber.

Periodically grit collecting in the collection chamber is removed for disposal by means of an air-lift or other convenient extraction mechanism.

As mentioned above the inlet flow is directed tangentially into the settlement chamber of the grit trap and thus forms a rotating flow within the chamber. The intention is that liquid with entrained organic solids will exit from the chamber over an outlet weir at substantially the same rate that inlet flow enters the chamber. The rotating flow within the chamber defines a relatively low speed vortex which provides an opportunity for the heavier grit and stones to separate under gravity from the organic solids which are of lower density and also tends to cause the settlings solids, both grit and organic solids, to migrate towards the axis of the vortex, so as to collect in the collection chamber of the grit trap. The nature of the vortex flow in the separation chamber of grit trap is a compromise between grit settlement and separation of organic solids. It will be recognised that if the rotational speed and flow through the chamber is too slow then organic solids will settle with the grit. On the other hand if the speed is too high then the finer grit will not settle and will remain suspended in the flow exiting the grit trap. The speed and volume of the inlet flow to the grit trap is not constant and so in order to provide greater constancy of the conditions in the trap there is provided a rotating impeller which ensures a predetermined rotating rate of flow in the separation chamber of the trap. Usually the compromise which is selected is flow conditions which permit settlement of substantially the whole of the stone and grit load of the inlet flow, and inevitably therefore some organic solids settle with the grit either by gravity separation, or by being attached to settling grit particles. Accordingly grit collecting in the collection chamber of the grit trap is contaminated to some extent with organic solids. It is known to try to improve the separation of organic solids from grit by modifying the rotating impeller so that the vortex flow generated has an upward component. It is highly desirable that collected grit for disposal is in a sufficiently clean condition for disposal without further treatment, but the presence of organic solids with the settled grit extracted from the grit trap often necessitates washing of the grit extracted from the grit trap prior to disposal.

The problem of contamination of the settled grit with organic solids has been recognised. U.S. Pat. No. 3,941,698 discusses the problem, and suggests the use of an "air scour" whereby periodically air is pumped into the grit collection chamber through four radially disposed pipes with the objective that the air flow will dislodge organic materials from the already settled grit. Clearly however the application of air is periodic, and is localised within the grit collection chamber so that a substantial amount of the collected grit will be untreated by the air scour.

The use of an air scour is also disclosed in our earlier British Patent 2148744 where a single pipe 22 extending axially of the grit collection chamber, and which normally forms part of the air lift for removing grit from the chamber, can be used periodically in reverse to pump air into the grit collection chamber again with the objective of dislodging organic solids from the already settled grit and floating it upwardly through the collection chamber and the separation chamber. However, it is apparent that the pipe 22 can only treat grit in the immediate vicinity of the pipe outlet.

British Patent 830531 discloses an arrangement where air is bubbled into the body of liquid in the separation chamber. It should be noted however that the disclosure in British Patent 830531 is of an aeration system and not an "air washing" arrangement. The objective of aeration is to ensure that there is sufficient oxygen in the liquid sewage to ensure subsequent biological processing of the organic load. Aeration as disclosed in British Patent 830531 would have little or no effect on the entrapment of organic solids with the settled grit.

It is an object of the present invention to provide a grit trap affording efficient settlement of grits while minimising the amount of organic solids retained with the grits.

DISCLOSURE OF THE INVENTION

In accordance with a first aspect of the present invention there is provided a vortex grit trap comprising a generally vertically extending tank of circular cross-section including a separation zone having an inlet and an outlet for liquid flow to and from the tank, and in which liquid is circulated about a longitudinal axis of the tank, and, a grit collection zone positioned beneath the separation zone, a generally circular tank divider centred on the vertical longitudinal axis of the tank and extending transverse thereto, the divider defining a notional boundary between the separation and collection zones of the tank and being of smaller diameter than the adjacent region of the tank so as to define with the adjacent tank wall an annulus through which grit passes from the separation zone to the collection zone in use, and, means for generating a cloud of gas bubbles migrating in use upwardly through substantially the whole of said annulus whereby substantially all grit passing from the separation zone into the collection zone passes through the upwardly moving bubble cloud in said annulus so that organic solids settling with the grit are displaced upwardly by the bubbles into the flow within the separation zone while the grit passes through the bubble cloud in the annulus and into the collection zone.

Conveniently said gas is air.

Preferably said divider includes an axially extending peripheral skirt or wall extending said annulus into an annular passage in which said bubble cloud is formed and through which settling grit and rising air bubbles pass in generally opposite directions.

Desirably said means for generating said upwardly moving bubble cloud in the said annulus rotates about the longitudinal axis of the tank to ensure even distribution of bubbles in the annulus.

Conveniently said divider forms part of said means for generating said bubble cloud, air under pressure being supplied to the interior of said axially extending skirt or wall and passing through circumferentionally distributed perforations in said skirt or wall to liberate air bubbles into the liquid in said annulus.

Preferably said divider rotates about the longitudinal axis of the tank and includes, on its face presented to the separation zone of the tank, impeller means generating, through rotation of the divider, a rotational flow in the liquid in the separation zone.

Desirably the separation zone is of significantly larger diameter than the collection zone and the separation zone includes, at its lower-most end, a frusto-conical region terminating at the collection zone.

In one construction said tank wall is defined at least in part by a tank liner.

In accordance with a second aspect of the present invention there is provided a method of separating grit from an aqueous sewage flow containing, inter alia, particulate grit and organic solids, the method comprising, generating and maintaining a rotating flow in a tank to permit gravity separation of the denser particles in the flow towards the axis of rotation, causing the settling particles to pass through an annular gap in a first direction, and, causing a continuous cloud of gas bubbles to pass through said annular gap in an opposite direction, whereby the coaction of the settling particles with the bubble cloud separates lower density organic solids from the settling particles and returns them to the rotating flow allowing the more dense grit particles to collect for removal.

BRIEF DESCRIPTION OF THE DRAWINGS

One example of the invention is illustrated in the accompanying drawings wherein:-

PREFERRED MODE FOR CARRYING OUT THE INVENTION

Figure 1:
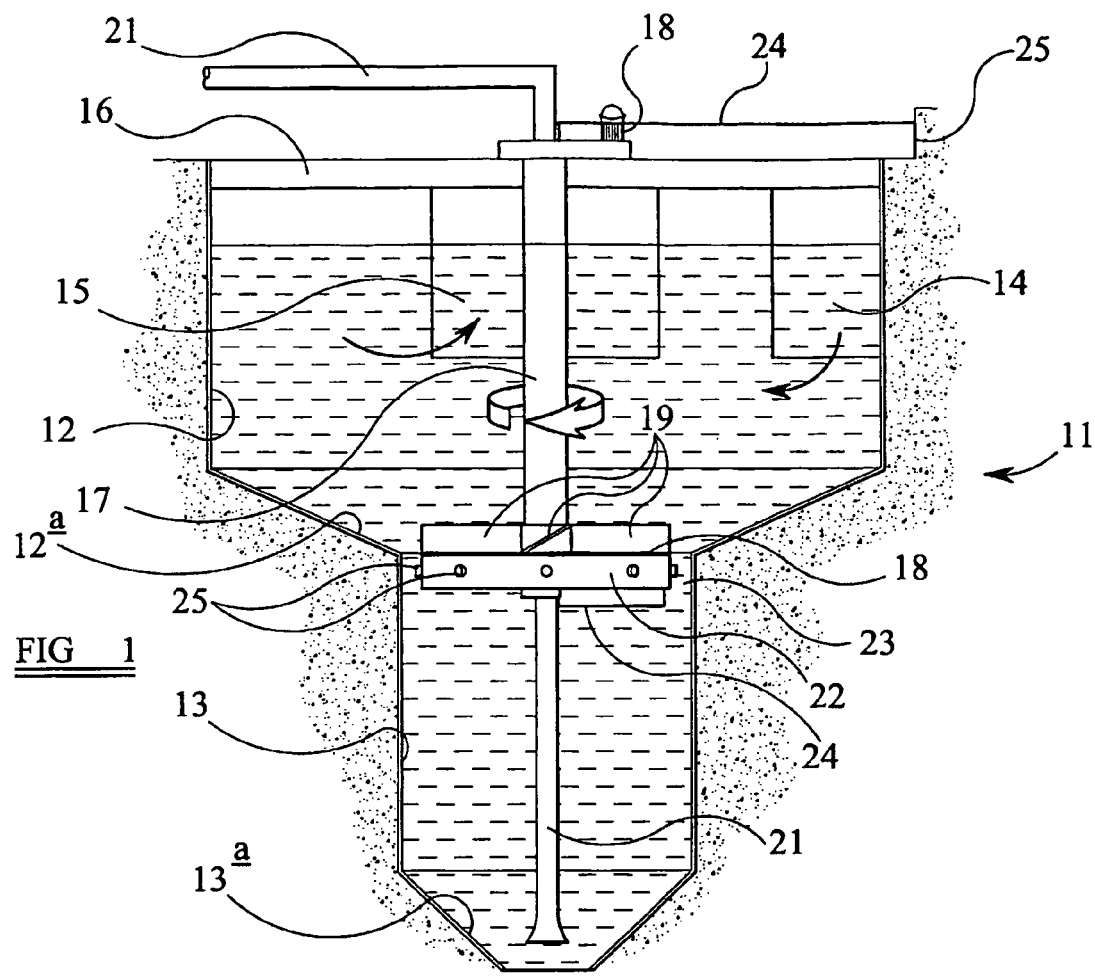
FIG. 1 is a diagrammatic side elevational view of a vortex grit trap.

Referring to the accompanying drawings, the vortex grit trap comprises a hollow vessel 11 which may be a cast concrete structure and which may be set into the ground so that the open top of the vessel is flush, or substantially flush with ground level. It is to be recognised however that the vessel need not be completely, or even partially set into the ground, and can be constructed as a metal fabrication rather than a cast concrete structure. The internal void of the vessel 11 defines a tank of circular cylindrical form having its longitudinal axis arranged generally vertically in use. The tank consists of a larger diameter upper, settlement zone 12, and vertically beneath the settlement zone 12 the tank defines a smaller diameter grit collection zone 13 coaxial with the settlement zone 12. The lower end of the settlement zone 12 is of frusto-conical form, the inclined surface 12a of which directs grit settling thereon into the upper end of the collection zone 13. The lower end region 13a of the collection zone 13 is also of frusto-conical form so as to concentrate collected grit around the axis of the vessel 11.

Raw sewage flow enters the settlement zone 12 tangentially through an inlet passage or launder 14, and can exit the separation zone 12 by way of an outlet passage or launder 15 extending radially outwardly from the separation zone 12 and spaced, in the direction of flow around the zone 12, by approximately 300° from the inlet 14. A weir may be placed in the outlet 15 to control the liquid level in the tank.

Figure 2:
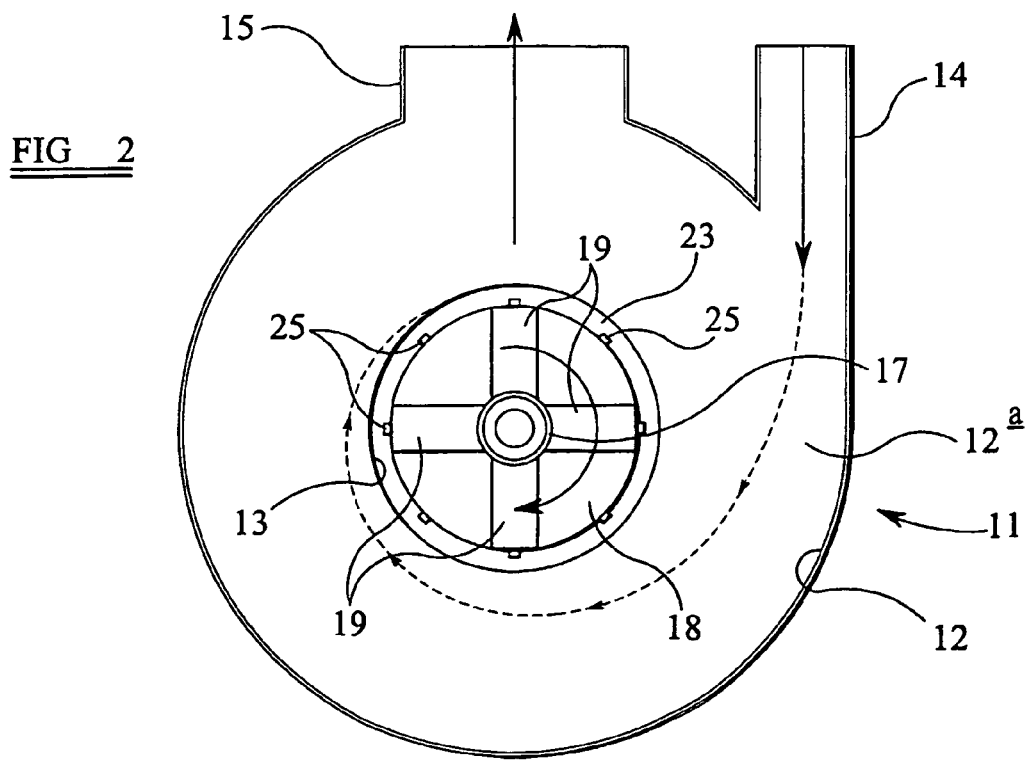
FIG. 2 is a partial plan view of the trap of FIG. 1.
Figure 3:
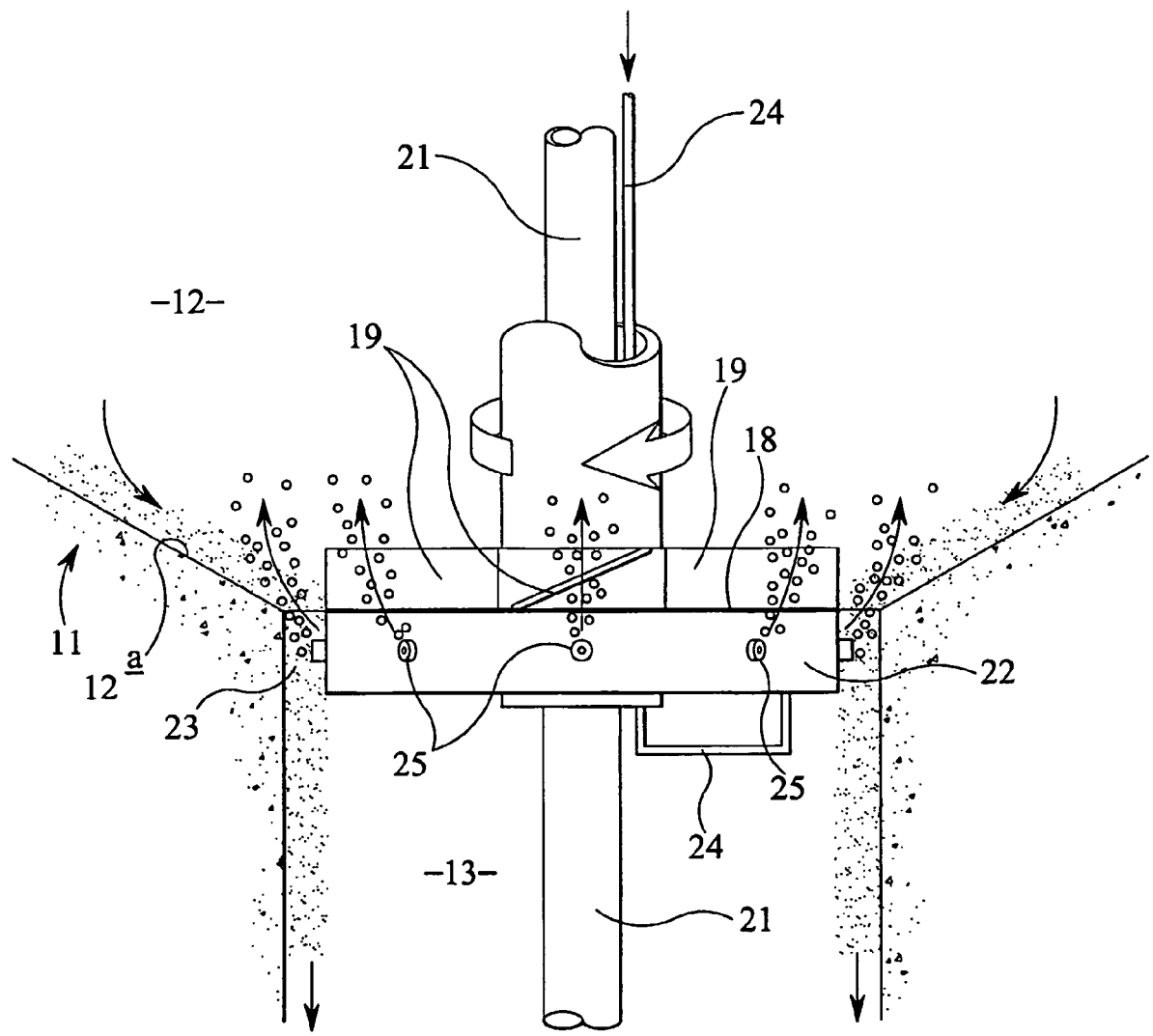
FIG. 3 is a diagrammatic enlargement of part of FIG. 1 illustrating the trap in use.

As the liquid flow enters tangentially there will inherently be a circulation (clockwise as shown in FIG. 2) of liquid within the zone 12 of the vessel. The circulating flow produces a vortex in the separation zone 12 which maintains less dense organic solids in suspension, while at the same time separating or classifying the solids, thus separating the grits and small stones from the organic solids. It is well recognised that there is an optimum flow condition in the separation zone in which grit separation occurs. Increasing the flow velocity will assist in separating grit from lighter or less dense solids, but with the attendant risk that finer grits will remain in suspension by virtue of the increased flow velocity and will exit with the organic solids in the flow leaving the zone 12 through the outlet 15 rather than being collected. Conversely, reducing the flow velocity below the optimum will permit all of the grits to be collected, but at the same time will permit an increased proportion of the organic solids to settle with the grit.

It is understood that because of inherent fluctuations in the inlet flow to the vessel 11 it is impractical to rely upon the inlet flow into the zone 12 to maintain the optimum circulating flow conditions in the separation zone 12. Accordingly there is provided an impeller arrangement in the vessel for maintaining and directing the flow within the separation zone 12 at its optimum. The impeller arrangement includes a fixed bridge structure 16 spanning the open upper end of the separation zone 12 and supporting a rotatable shaft 17 which extends downwardly through the separation zone 12 to the junction of the frusto-conical region of the zone 12 with the zone 13. The shaft 17 is hollow, and is supported in the bridge 16 by bearings permitting the rotation of the shaft 17. The shaft 17 is coaxial with the vessel 11 and is driven for rotation by an electric motor and reduction gear arrangement 18 supported on the bridge.

At its lower end the shaft 17 carries a circular disc 18 through which the shaft 17 extends. The disc 18 is rigidly secured to the shaft 17 to rotate therewith. On its upper surface the disc 18 carries four radially extending, equiangularly spaced, inclined impeller blades or paddles 19 which, as the disc 18 rotates, generate an upward spiral circulation within the separation zone 12 about the axis of the shaft 17 and vessel 11. It can be seen in the drawings that the rotational direction of the shaft 17 and disc 18 is the same as the direction of rotation of the flow entering the separation zone 12 through the inlet 14. The blades 19 are inclined with their leading edge lowermost and so generate a flow within the vessel 12 which has circulating and upward components.

As the impeller structure rotates the flow within the zone 12 maintains lighter organic solids in suspension to flow with the liquid from the vessel 11 through the outlet 15. The rotational movement causes the settling solids (grit and organic) to migrate towards the axis of rotation of the flow and so particles which collect on the frusto-conical surface 12a are swept in an inwardly spiralling path and migrate downwardly into the collection zone 13 and more particularly are concentrated into the region 13a of the collection zone 13 and so enter the collection zone through an annular gap defined between the outer periphery of the disc 18 and the junction of the surface 12a and the cylindrical wall of the collection zone 13.

It will be recognised that the disc 18 can be thought of as a divider above which is the separation zone 12 and below which is the collection zone 13. In a tank of the form shown including the frusto-conical region 12a the disc will be at the level of the junction of region 12a with zone 13. It will be understood that the tank could be designed with a horizontal floor to the zone 12 from which the zone 13 descends, and in such an arrangement the disc 18 would desirably be positioned co-planar with the floor of the zone 12.

An air-lift tube 21 extends downwardly, coaxially within the shaft 17, and protrudes below the end of the shaft 17 into the region 13a of the collection zone 13. In known manner the air lift tube 21 can be supplied with an internal air flow generating an upward liquid flow through the tube 21 of sufficient speed to carry with it collected grit from around the open end of the tube in the region 13a of the collection zone 13. The air-lift is used periodically to empty grit from the collection zone 13, but other forms of grit extraction are possible.

As the vortex circulation within the separation zone 12 is optimised for grit settlement it is inevitable that some organic solids will be sufficiently dense to migrate downwardly through the annular gap and into the collection zone 13. Furthermore, some organic solids will adhere to grit and stone particles and will be carried therewith into the collection zone 13. Thus although ideally the grit collecting in these region 13a is sufficiently clean for immediate disposal, this is often not the case, and when using conventional vortex grit traps it is often necessary to subject the collected grit issuing from the air-lift 21 or other extraction mechanism to a subsequent washing action before the grit is sufficiently free of organic solids to be disposed of.

The accompanying drawings illustrate an improved form of grit trap in which a much greater proportion of the organic solids can be removed with the liquid flow from the vessel outlet 15, leaving the collected grit in the zone 13a sufficiently clean for disposal without subsequent washing.

It can be seen in the accompanying drawings that the disc 18 is disposed as a divider between the separation zone 12 and the collection zone 13 of the tank defined by the vessel 11. Moreover, the disc 18 is provided with an axially downwardly extending peripheral skirt 22 parallel to the adjacent wall of the collection zone 13 and thus defining therewith an annular passage 23. The annular passage 23 terminates, at its upper end, at the annular gap defined between the wall of the vessel and the peripheral edge of the disc 18.

An air supply pipe 24 receiving compressed air from an electrically driven blower 25 supported on the bridge 16 or the structure of the vessel adjacent to the bridge 16, extends downwardly through the shaft 17 and into the inverted dish defined by the disc 18 and skirt 22. Air is continually discharged into the confines of the skirt 22 from the pipe 24 during operation of the grit trap and a plurality of nozzles or perforations 25 equianguarly spaced around the skirt 22 allow the air collecting within the skirt 22 beneath the disc 18 to issue as streams of small bubbles into the annular passage 23.

The rate of bubble formation, the number and spacing of the nozzles or perforations 25, and the speed of rotation of the disc 18 and skirt 22 is such that the annular passage 23, above the level of the perforations 25, is substantially completely and evenly filled with bubbles such that solid particles moving downwardly from the zone 12 into the zone 13 must, in their downward movement through the passage 23, interact with a mass or cloud of upwardly moving air bubbles. While grit and stones have sufficient density to pass through the bubble cloud in the annular passage 23 to collect in the collection zone 13, organic solids will be swept upwardly by the bubble cloud to be carried upwardly thereby into the upward circulation within the liquid in the zone 12, and to flow with that liquid from the vessel by way of the outlet 15. Furthermore, any organic solids adherent to grit or stone particles are likely to be dislodged by the bubble cloud allowing the grit or stone to reach the collection zone while the dislodged organic solids are returned to the flow in the separation zone 12.

It will be understood that if desired the nozzles or perforations 25 of the air bell defined by the disc 18 and skirt 22 could be replaced by notches or the like around the lower horizontal peripheral edge of the skirt 22. The number of notches or perforations 25 is selected in relation to the speed of rotation of the disc 18 to ensure that the whole of the annular passage 23 above the level of bubble formation, contains parts of a substantially continuous annular bubble cloud.

Although it is convenient to provide the impeller structure on the upper face of the disc 18 it is to be understood that if desired the impeller structure could be separated from the air bell defined by the disc 18 and the skirt 22, and could if desired be positioned spaced upwardly along the shaft 17 from the disc 18. It is however believed that optimum performance is achieved by providing the impeller structure on the upper surface of the disc 18 such that the upward spiral vortex generated by the impeller structure is present immediately above the annular gap between the disc 18 and the wall surface 12a.

Figure 4:
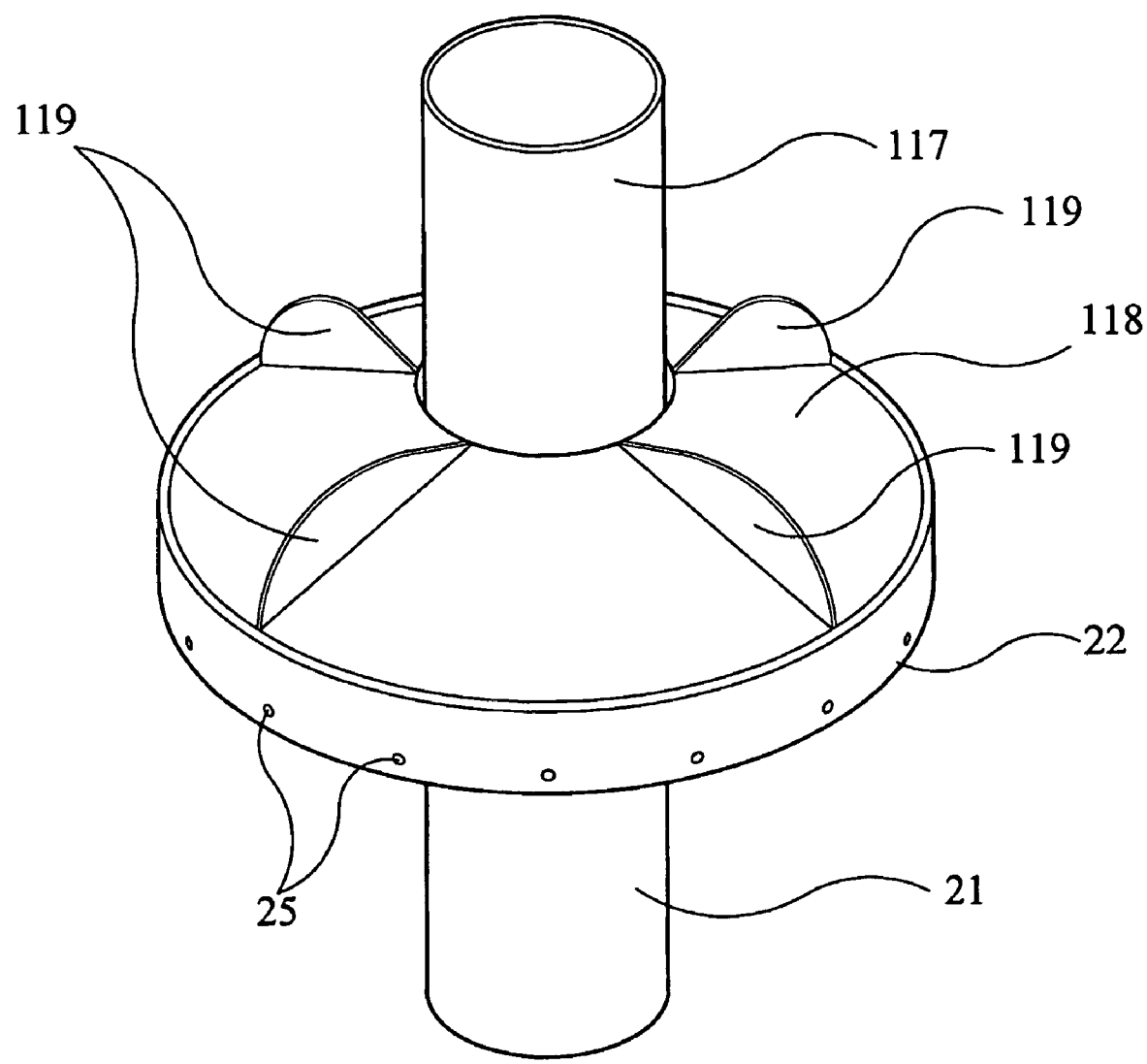
FIG. 4 is a perspective view of an alternative divider/impeller construction.

FIG. 4 illustrates an alternative disc and impeller structure to that described above. The disc 118 is convex presenting its domed surface upwardly so that it will tend to shed any particles settling thereon, radially outwardly into the annulus through which the bubble cloud propagates. Moreover, recognising that the provision of the bubble cloud significantly improves separation of organic material from the settling grit, the impeller is simplified to four equiangularly spaced, vertically extending paddles 119 which maintain a rotational flow in the zone 12 but do not seek to generate an upward flow in the zone, relying on the upward movement of the bubble cloud to carry organic material from the annular gap into the body of liquid in the zone 12.

In a modification (not illustrated) the frusto-conical wall 12a of the separation zone 12 is extended at its lower end by a frusto-conical tank liner which seats on the surface 12a and protrudes into the upper end of the collection zone 13, and so reduces the diameter of the opening into the collection zone. The liner can be a stainless steel or other metal fabrication or could be a synthetic resin moulded article, and desirably includes an axial sleeve extending downwardly into the zone 13. The axial sleeve may be in contact with, or spaced inwardly from, the adjacent surface region of the collection zone 13. The disc 18 and its associated components will be of correspondingly reduced diameter to fit within the liner and to cooperate with the liner to define the annulus or annular passage through which the bubble cloud and the settling particles pass. In effect the liner defines the wall of the tank with which the disc 18 cooperates.

It will be recognised that by comparison with prior art constructions described above all of the grit separating in the zone 12 and migrating towards the zone 13 is subjected to "air washing" by the bubble cloud in the annular passage 23. It will further be recognised that the provision of the bubble cloud assisting separation of grit from organic solids also provides aeration of the sewage flow issuing from the outlet 15 for biological processing in the sewage treatment plant. It is believed that the provision of a continuous bubble cloud through which all settling materials must pass allows the designer of the trap to separate considerations of settlement and separation when determining flow velocity and direction in the zone 12 of the tank. Thus the designer can rely more heavily on the bubble cloud for separation of organic material from grit and can determine the best flow conditions for settlement. In turn this may, as suggested above, allow the designer to simplify the impeller since it may permit the impeller to be concerned only in the generation of a rotational flow for settlement without the need for a vertical flow for separation.

The invention claimed is:

1. A vortex grit trap comprising a generally vertically extending tank of circular cross-section including a separation zone having an inlet and an outlet for liquid flow to and from the tank, and in which liquid is circulated about a longitudinal axis of the tank, and, a grit collection zone positioned beneath the separation zone in use, the trap further comprising a generally circular tank divider centered on the vertical longitudinal axis of the tank and extending transverse thereto, the divider defining a notional boundary between the separation and collection zones of the tank and being of smaller diameter than the adjacent region of the tank so as to define with the adjacent tank wall an annulus through which grit passes from the separation zone to the collection zone in use, and, means for generating a cloud of gas bubbles migrating in use upwardly through substantially the whole of said annulus whereby substantially all grit passing from the separation zone into the collection zone passes through the upwardly moving bubble cloud in said annulus so that organic solids settling with the grit are displaced upwardly by the bubbles into the flow within the separation zone while the grit passes through the bubble cloud in the annulus and into the collection zone, said means for generating including at least one outlet or nozzle disposed approximately at said boundary between the separation and collection zones.

2. A vortex grit trap as claimed in claim 1 wherein said gas is air.

3. A vortex grit trap as claimed in claim 1 wherein said divider includes an axially extending peripheral skirt extending said annulus into an annular passage in which said bubble cloud is formed and through which settling grit and rising air bubbles pass in generally opposite directions.

4. A vortex grit trap as claimed in claim 1 wherein said means for generating said upwardly moving bubble cloud in the said annulus rotates about the longitudinal axis of the tank to ensure even distribution of bubbles in the annulus.

5. A vortex grit trap as claimed in claim 1 wherein said divider forms part of said means for generating said bubble cloud, air under pressure being supplied to the interior of said axially extending skirt and passing through circumferentially distributed perforations in said skirt or wall to liberate air bubbles into the liquid in said annulus.

6. A vortex grit trap as claimed in claim 1 wherein said divider rotates about the longitudinal axis of the tank and includes, on its face presented to the separation zone of the tank, impeller means generating, through rotation of the divider, a rotational flow in the liquid in the separation zone.

7. A vortex grit trap as claimed in claim 1 wherein the separation zone is of significantly larger diameter than the collection zone and the separation zone includes, at its lowermost end, a frusto-conical region terminating the collection zone.

8. A vortex grit trap as claimed in claim 1 wherein the tank wall is defined at least in part by a tank liner.

9. A method of separating grit from an aqueous sewage flow containing, inter alia, particular grit and organic solids, the method comprising, generating and maintaining a rotating flow in a tank to permit gravity separation of the denser particles in the flow towards the axis of rotation, causing the settling particles to pass through an annular gap in a first direction, and, during the maintaining of the rotating flow in said tank, causing a continuous cloud of gas bubbles to pass through said annular gap in an opposite direction, whereby the coaction of the settling particles with the bubble cloud separates lower density organic solids from the settling particles and returns them to the rotating flow allowing the more dense grit particles to collect for removal, wherein the causing of said continuous cloud of gas bubbles to pass through said annular gap includes dispensing gas into said annular gap through a plurality of circumferentially spaced nozzles.

10. A vortex grit trap as claimed in claim 1 wherein said means for generating includes a plurality of nozzles or perforations disposed at said boundary between the separation and collection zones.

11. A vortex grit trap as claimed in claim 10 wherein said nozzles or perforations are on said divider and thus dispense gas in an outward direction into said annulus.

12. A vortex grit trap as claimed in claim 11 wherein said nozzles or perforations are circumferentially spaced about said divider.

13. The method claimed in claim 9 wherein the causing of said continuous cloud of gas bubbles to pass through said annular gap includes causing said cloud of gas bubbles to pass substantially uniformly throughout said annular gap.

* * * * *